(12) United States Patent
Kang et al.

(10) Patent No.: US 12,744,915 B2
(45) Date of Patent: Sep. 22, 2026

(54) METHOD AND APPARATUS FOR VIDEO CODING USING AN IN-LOOP FILTER BASED ON A TRANSFORMER

(71) Applicants: HYUNDAI MOTOR COMPANY, Seoul (KR); KIA CORPORATION, Seoul (KR); EWHA UNIVERSITY - INDUSTRY COLLABORATION FOUNDATION, Seoul (KR)

(72) Inventors: Je Won Kang, Seoul (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 21 days.

(21) Appl. No.: 18/795,899

(22) Filed: Aug. 6, 2024

(65) Prior Publication Data

US 2024/0397057 A1 Nov. 28, 2024

Related U.S. Application Data

(63) Continuation of application No. PCT/KR2023/001180, filed on Jan. 26, 2023.

(30) Foreign Application Priority Data

Feb. 21, 2022 (KR) ........................ 10-2022-0022404
Jan. 18, 2023 (KR) ........................ 10-2023-0007352

(51) Int. Cl.
*H04N 19/80* (2014.01)
*H04N 19/117* (2014.01)
(Continued)

(52) U.S. Cl.
CPC ......... *H04N 19/176* (2014.11); *H04N 19/119* (2014.11); *H04N 19/154* (2014.11);
(Continued)

(58) Field of Classification Search
CPC ...... H04N 19/80; H04N 19/82; H04N 19/117; G06N 3/0464
See application file for complete search history.

(56) References Cited

U.S. PATENT DOCUMENTS 11,297,341 B2 4/2022 Erfurt
11,575,885 B2 2/2023 Kang
(Continued)

FOREIGN PATENT DOCUMENTS

KR 20220012393 A 2/2022
WO 2021088951 A1 5/2021

OTHER PUBLICATIONS

Convolutional neural network based In-loop filter with adaptive model selection; Jan. 2021 (Year: 2021).*
(Continued)

*Primary Examiner* — Luis Perez-Fuentes
(74) *Attorney, Agent, or Firm* — Lempia Summerfield Katz LLC

(57) ABSTRACT

A method and an apparatus are disclosed for video using an in-loop filter based on Transformer. The video coding method and the apparatus apply a current video block to an attention module of a Transformer, which is a deep learning model. The video coding method and the apparatus utilize the resultant Transformer-based in-loop filter.

16 Claims, 21 Drawing Sheets

(51) Int. Cl.
*H04N 19/119* (2014.01)
*H04N 19/154* (2014.01)
*H04N 19/172* (2014.01)
*H04N 19/176* (2014.01)
*H04N 19/42* (2014.01)
*H04N 19/60* (2014.01)
*H04N 19/82* (2014.01)

(52) U.S. Cl.
CPC ........... *H04N 19/172* (2014.11); *H04N 19/42* (2014.11); *H04N 19/60* (2014.11); *H04N 19/80* (2014.11)

(56) References Cited

U.S. PATENT DOCUMENTS 11,671,591 B2 6/2023 Zhang
11,936,853 B2 3/2024 Kang
12,238,343 B2 * 2/2025 Ma ......................... H04N 19/82
12,321,870 B2 * 6/2025 Zou .......................... G06N 3/08
12,323,607 B2 * 6/2025 Cricri ....................... G06N 3/09
12,323,608 B2 * 6/2025 Li .......................... H04N 19/31
12,363,350 B2 * 7/2025 Wang ..................... H04N 19/59
2020/0029071 A1 1/2020 Kang
2020/0366918 A1 11/2020 Erfurt
2021/0400286 A1 12/2021 Kale
2022/0103864 A1 * 3/2022 Wang ................... H04N 19/192
2022/0217403 A1 * 7/2022 Choi .................... H04N 19/184
2022/0264087 A1 8/2022 Zhang
2023/0188708 A1 6/2023 Kang
2023/0291894 A1 9/2023 Zhang
2023/0345003 A1 * 10/2023 Chen .................... H04N 19/124
2024/0155110 A1 5/2024 Kang

OTHER PUBLICATIONS

Deep In-loop filter with adaptive model selection; Yue Li; 2021; (Year: 2021).*

International Search Report and Written Opinion cited in corresponding international patent application No. PCT/KR2023/001180; May 17, 2023; 10 pp.

Yue Li et al.; AHG11: Deep In-Loop Filter with Adaptive Model Selection and External Attention; Document No. JVET-W0100; Joint Video Experts Team (JVET) of ITU-T SG 16 WP 3 and ISO/IEC JTC 1/SC 29; Jul. 2021; 6 pp.

* cited by examiner

METHOD AND APPARATUS FOR VIDEO CODING USING AN IN-LOOP FILTER BASED ON A TRANSFORMER

CROSS-REFERENCE TO RELATED APPLICATIONS

This application is a continuation of International Application No. PCT/KR2023/001180 filed on Jan. 26, 2023, which claims priority to and the benefit of Korean Patent Application No. 10-2022-0022404, filed on Feb. 21, 2022, and Korean Patent Application No. 10-2023-0007352, filed on Jan. 18, 2023, the entire contents of each of which are incorporated herein by reference.

TECHNICAL FIELD

The present disclosure relates to a video coding method and an apparatus using an in-loop filter based on Transformer.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required. Recently, Transformer has been utilized in addition to Convolutional Neural Network (CNN), a deep learning technology, to improve the quality of video frames. For in-loop filtering in particular, increasing the video encoding efficiency and the enhancement of video quality needs the efficient utilization of the deep learning technology.

SUMMARY

The present disclosure seeks to provide a video coding method and an apparatus that apply a current video block to an attention module of a Transformer, which is a deep learning model, to increase video coding efficiency and enhance picture quality. The video coding method and the apparatus utilize the resultant Transformer-based in-loop filter.

At least one aspect of the present disclosure provides a method performed by a video decoding device for enhancing a picture quality of a reconstructed frame. The method includes obtaining an input region of a preset size from the reconstructed frame which is a reconstruction of an original frame and has been reconstructed in advance by the video decoding device. The method also includes generating an enhanced video region that approximates the original frame by feeding the input region into an in-loop filter that is deep learning-based. The in-loop filter includes K consecutive Transformer blocks, and K is a natural number. Generating the enhanced video region includes converting, by using the K consecutive Transformer blocks, an input image into a final output feature based on an attention operation.

Another aspect of the present disclosure provides a method performed by a video encoding device for enhancing a picture quality of a reconstructed frame. The method includes obtaining an input region of a preset size from the reconstructed frame, which is a reconstruction of an original frame and has been reconstructed in advance by the video encoding device. The method also includes generating an enhanced video region that approximates the original frame by feeding the input region into an in-loop filter that is deep learning-based. The in-loop filter comprises K consecutive Transformer blocks, and K is a natural number. Generating the enhanced video region includes converting, by using the K consecutive Transformer blocks, an input image into a final output feature based on an attention operation.

Yet another aspect of the present disclosure provides a computer-readable recording medium storing a bitstream generated by a video encoding method. The video encoding method includes obtaining an input region of a preset size from a reconstructed frame which is a reconstruction of an original frame and has been reconstructed in advance by a video encoding device. The video encoding method also includes generating an enhanced video region that approximates the original frame by feeding the input region into an in-loop filter that is deep learning-based. The in-loop filter comprises K consecutive Transformer blocks, and K is a natural number. Generating the enhanced video region includes converting, by using the K consecutive Transformer blocks, an input image into a final output feature based on an attention operation.

As described above, the present disclosure provides a video coding method and an apparatus that apply a current video block to a Transformer's attention module which is a deep learning model, and utilize the resultant Transformer-based in-loop filter. Thus, the video coding method and the apparatus improve video coding efficiency and enhance video quality.

DETAILED DESCRIPTION

Figure 1:
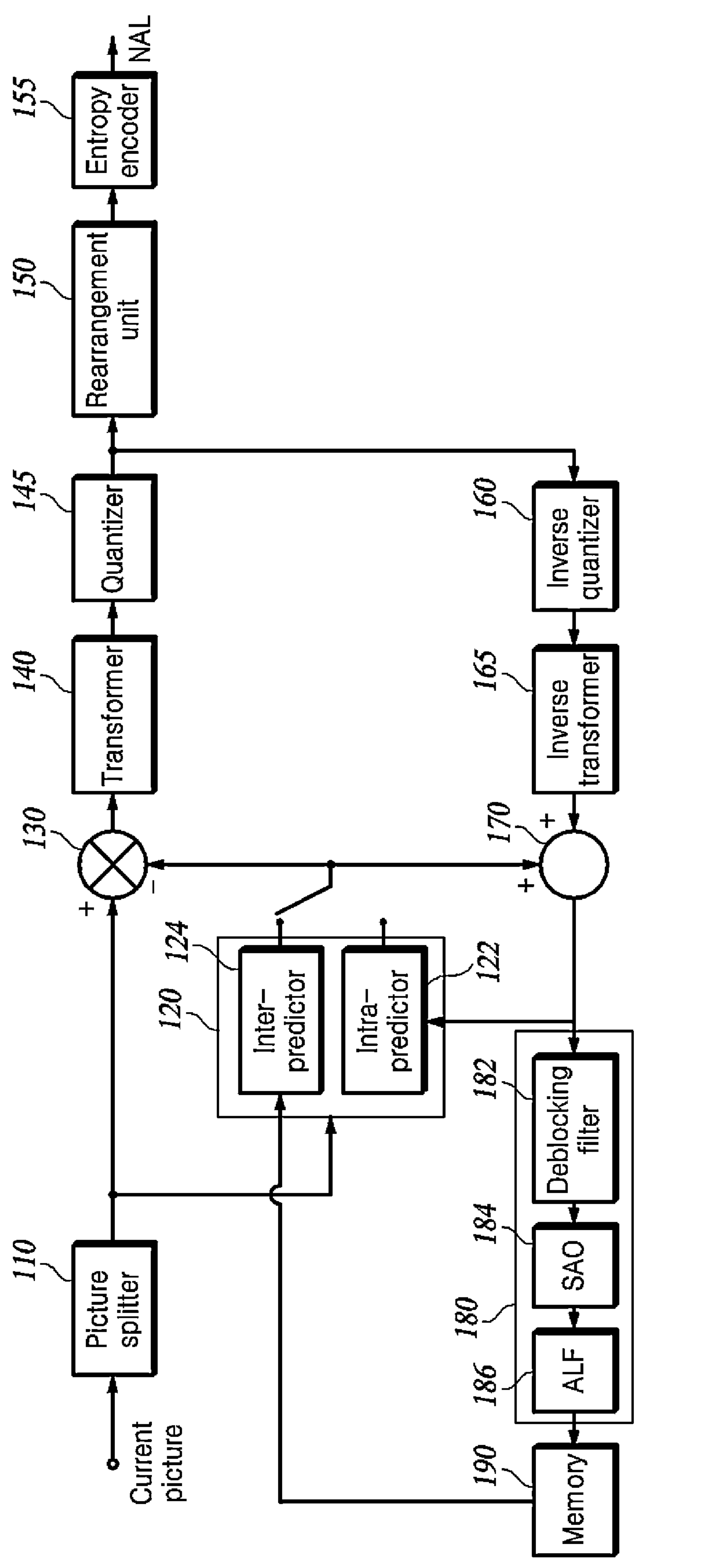
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUS included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
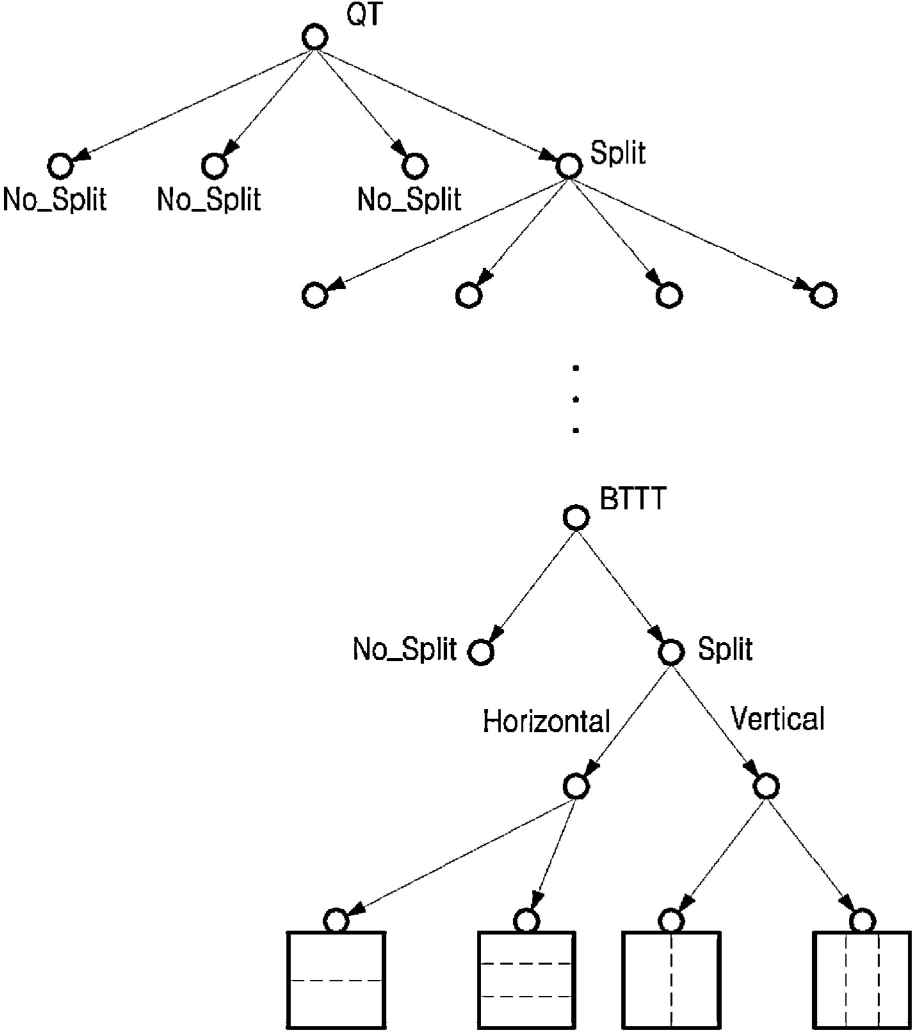
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
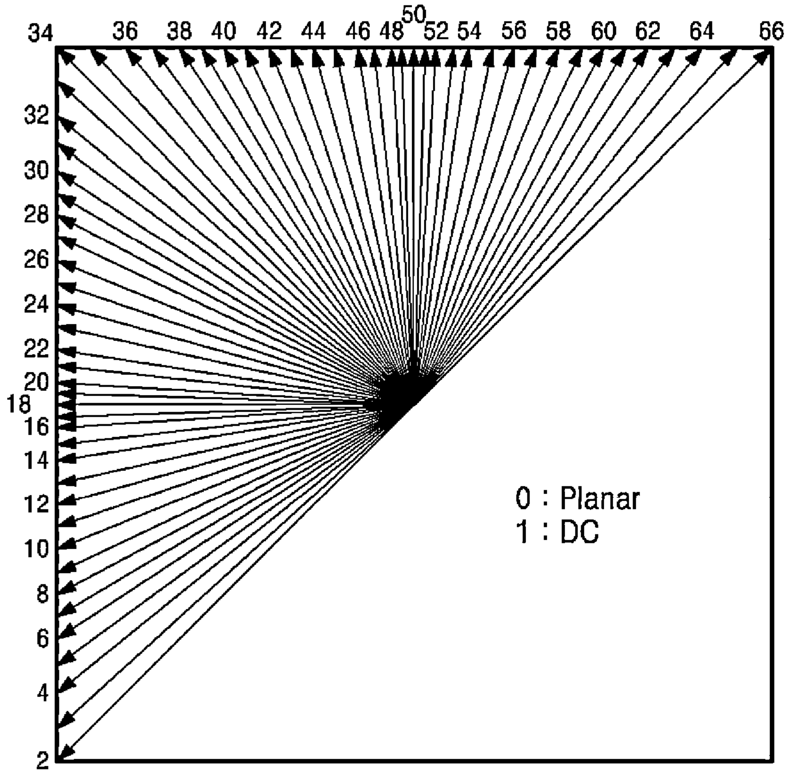
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
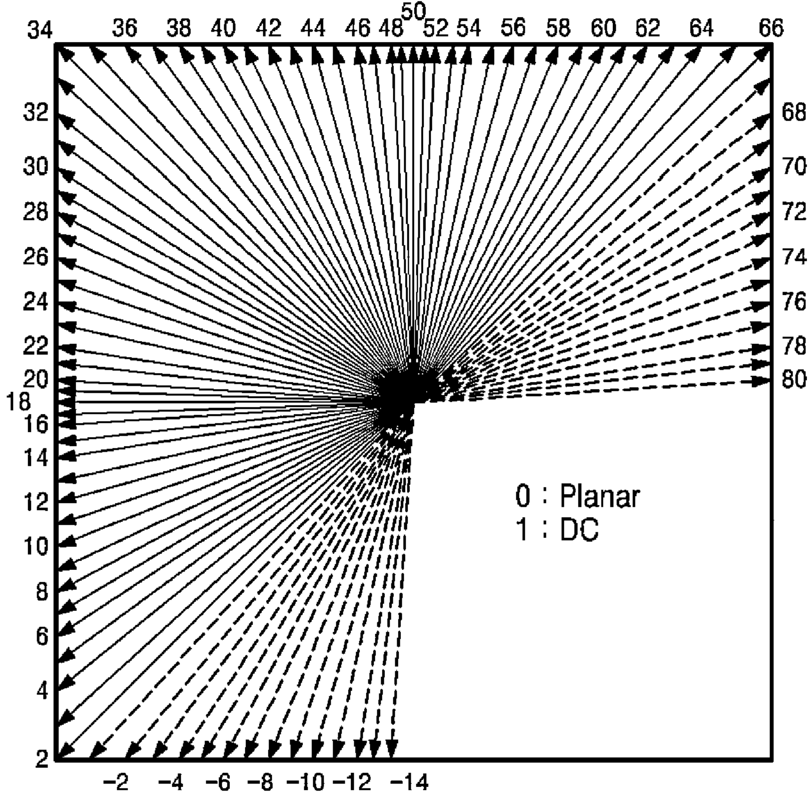

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than-135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
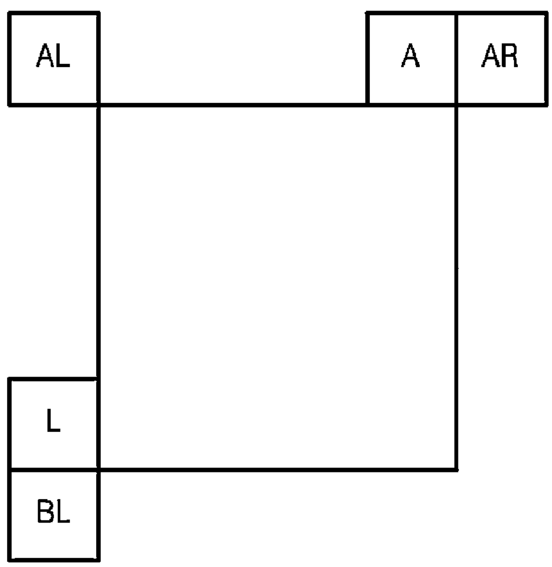
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
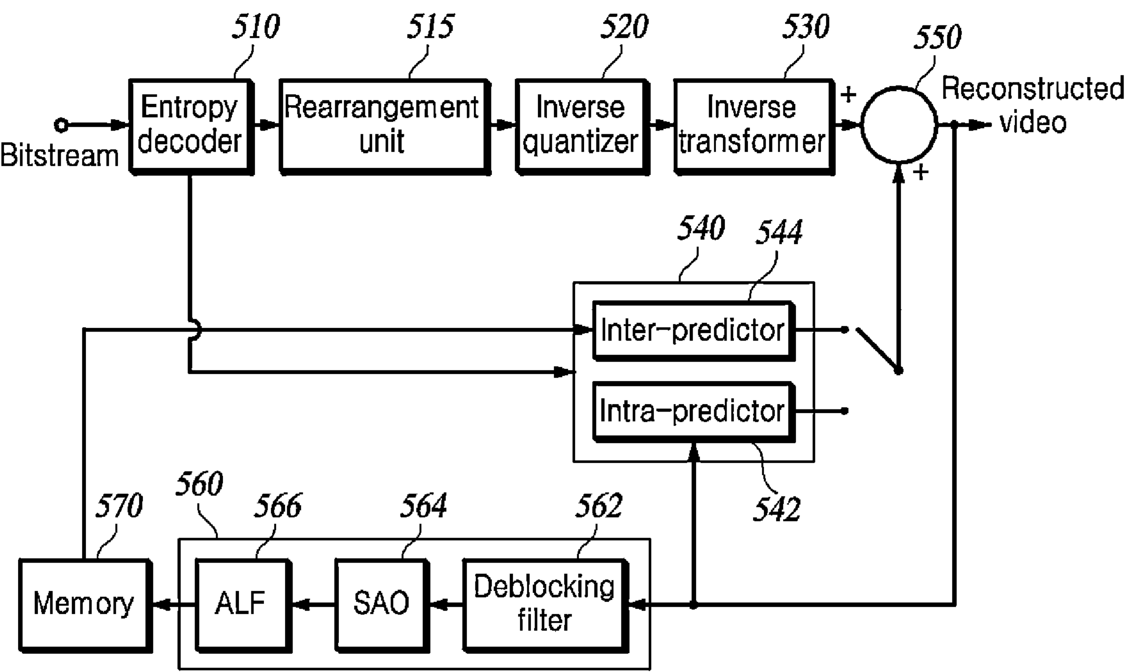
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above.

More specifically, the present disclosure provides a video coding method and an apparatus for applying a current video block to a Transformer's attention module that is a deep learning model and utilizing the resultant Transformer-based in-loop filter.

The following embodiments may be performed by the loop filter unit 180 in the video encoding device. The following embodiments may also be performed by the loop filter unit 560 in the video decoding device.

The video encoding device in performing the in-loop filtering of a reconstructed frame may generate signaling information associated with the present embodiments in terms of optimizing rate distortion. The video encoding device may use the entropy encoder 155 to encode the signaling information and may transmit the encoded signaling information to the video decoding device. The video decoding device may use the entropy decoder 510 to decode, from the bitstream, the signaling information associated with the in-loop filtering of the reconstructed frame.

In the following description, the term "target block" may be used interchangeably with the current block or coding unit (CU). The term "target block" may refer to some region of the coding unit.

Further, the value of one flag being true indicates when the flag is set to 1. Additionally, the value of one flag being false indicates when the flag is set to 0.

I. Convolutional Neural Network (CNN)

A CNN refers to a neural network composed of a plurality of convolution layers and a pooling layer and is a deep learning technique known to be best suited for image processing. The convolution layer extracts a feature map (or called 'feature' herein interchangeably) by using multiple kernels or filters. The filter-constituting kernel coefficients are the parameters that are determined during the learning process.

Among the convolution layers of the CNN, the front layer near the input extracts feature maps that respond to simple and low-level image features, such as lines, dots, or faces, while the back layer near the output extracts feature maps that respond to higher-level features such as textures and object parts.

Figure 6:
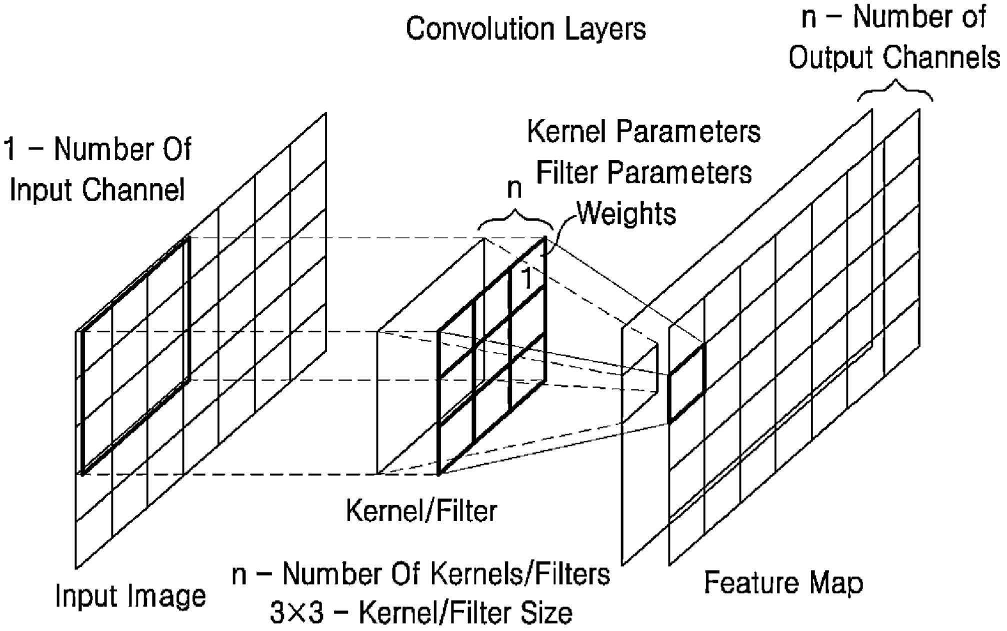
FIG. 6 is a diagram illustrating the operation of a convolution layer.

FIG. 6 is a diagram illustrating the operation of a convolution layer according to at least one embodiment of the present disclosure.

The convolution layer utilizes convolutional operations to generate a feature map from an input image. The example of FIG. 6 illustrates a kernel (or filter) with a kernel size of 3×3. The kernel size is also referred to as the filter size. The kernel has a kernel parameter or filter parameter, also referred to as a weight. The kernel illustrated in FIG. 6 has a total of nine kernel parameters. The kernel parameters may be initially set to arbitrary values, and their values may be updated based on training.

The convolution layer performs a convolutional operation by using blocks equal to the kernel size in the input image. In this case, a block of the size of the kernel in the input image is referred to as a window.

When filtering on the input image is performed in raster-scan order, the amount of the window movement is called the stride. In the example of FIG. 6, the stride is 1. If the stride is set to 2, the convolution operation is performed with the windows spaced out by 2 samples, resulting in the horizontal and vertical dimensions of the feature map being half the horizontal and vertical dimensions of the input image.

As mentioned above, a convolution layer may include a plurality of filters. The number of filter(s) or the number of kernel(s) is referred to as a channel(s). The number of channels is equal to the number of filters. The number of filters also determines the number of dimension of the feature map.

Padding refers to a method of expanding the input data by filling in a certain value around the input data before performing a convolutional operation. Padding is primarily used to control the spatial size of the output data. The value used for padding may be determined by hyperparameters, but zero-padding is commonly used. With no padding used, the spatial size of the output data decreases with each convolution layer, which may cause boundary information to be lost. Thus, to avoid this problem, padding is used, i.e., padding may be used to equalize the spatial size of the output data to that of the input data of the convolution layer.

A deconvolution layer performs the opposite operation of a convolution layer. The deconvolution layer produces the desired data image as an output from a feature map that is an input.

The pooling layer performs pooling which is the process of subsampling the feature map generated by the convolution layer. The pooling layer utilizes a 2×2 window to select samples so that the output is half the width and half the height of the input. In other words, the pooling layer is utilized to reduce the size of the input image or input feature map by condensing a 2×2 region into a single sample.

The opposite concept of a pooling layer is defined as an unpooling layer. An unpooling layer serves to increase dimensionality as opposed to a pooling layer and is typically used after a deconvolution layer.

A convolutional encoder-decoder structure is a network structure composed of pairs of a convolution layer and a deconvolution layer. A convolutional encoder is composed of a convolution layer and a pooling layer, which outputs a feature map (or feature vector) from the input image. The final output vector of a convolutional encoder is sometimes referred to as a latent vector. A convolutional decoder is composed of a deconvolution layer and an unpooling layer to generate an output image from the feature map or latent vector.

The inputs and outputs of the convolutional encoder-decoder may be varied depending on the purpose of the application and network. For example, the inputs and outputs may be optical flow maps, saliency maps, image frames, and the like.

Figure 7:
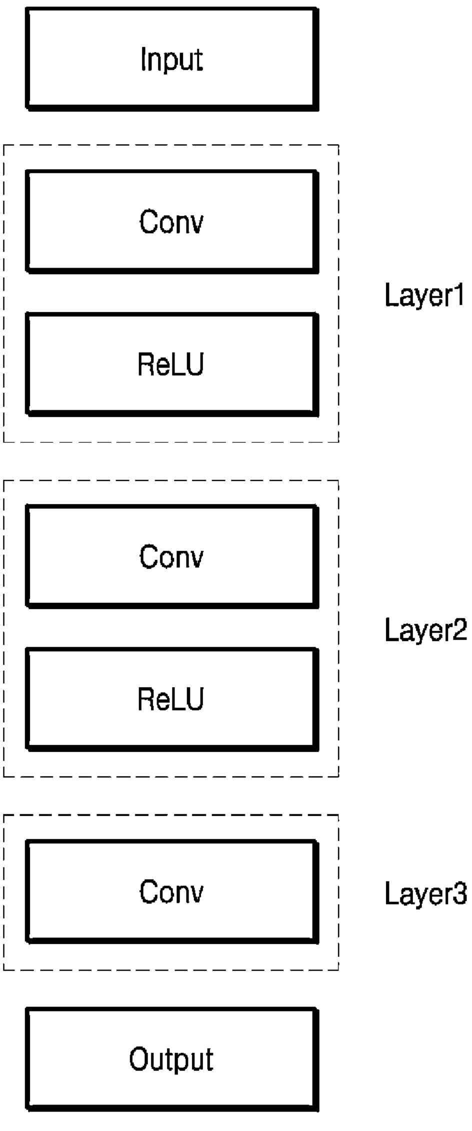
FIG. 7 is a diagram illustrating a single image super-resolution (SISR) network.

FIG. 7 is a diagram illustrating a single image super-resolution (SISR) network.

One example application of CNN is Single Image Super Resolution (SISR). A SISR network produces a high-resolution image as an output from a low-resolution input image. A SISR network may include multiple convolution layers, as illustrated in FIG. 7. Each convolution layer includes an activation function, such as a rectified linear unit (ReLU). The parameters of the SISR network may be trained such that the resulting Super Resolution (SR) image is close to the Ground Truth (GT).

Figure 8:
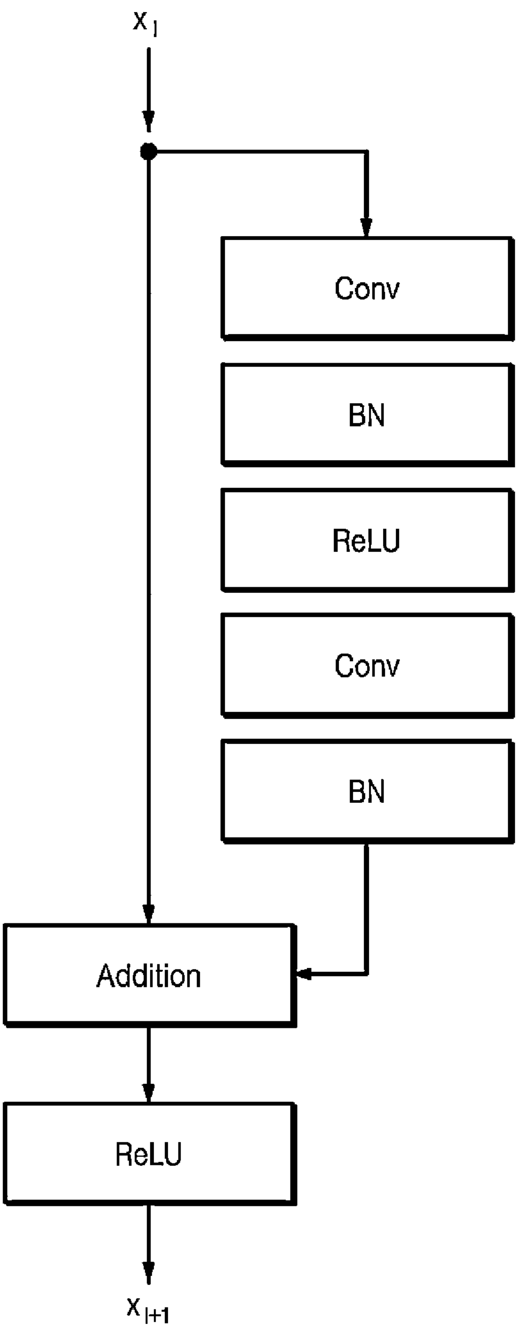
FIG. 8 is a diagram illustrating a residual block utilized in SISR.

SR methods using CNNs can improve SR performance by increasing the depth (e.g., by increasing the number of convolution layers). To overcome the problem of overfitting in learning that may occur with increasing depth, a residual block that may perform skip connections and residual learning may be utilized in the SISR network. The residual block includes a skip path in addition to a path for applying a convolutional operation to the input feature $x_l$, as illustrated in FIG. 8. The residual block may also select the convolutional operation path or the skip path based on learning efficiency when generating output $x_{l+1}$. In the example of FIG. 8, the residual block includes a batch normalization (BN) layer.

In one example, an enhanced deep residual network for SISR (EDSR) increases the performance of the network by increasing the depth by concatenating residual blocks in succession. Another example is Accurate Image Super-Resolution Using Very Deep Convolutional Networks (VDSR), a CNN model based on Visual Geometry Group (VGG) networks that uses residual learning, which is for adding residual frames to the final output. VDSR adds the residual signal to the input signal by adding the residual signal at the very end of the network.

As yet another example, a CNN may be utilized as an in-loop filter in the video encoding device or the video decoding device. In this case, the deep learning-based in-loop filter may be applied at any location within the existing loop filter units 180, 560 composed of the deblocking filter, the SAO filter, and the ALF.

As the deep learning-based in-loop filter, there is a fixed-coefficient in-loop filter. The fixed-coefficient deep learning in-loop filter utilizes the same CNN kernel parameters stored on the video encoding device side and video decoding device side.

Figure 9:
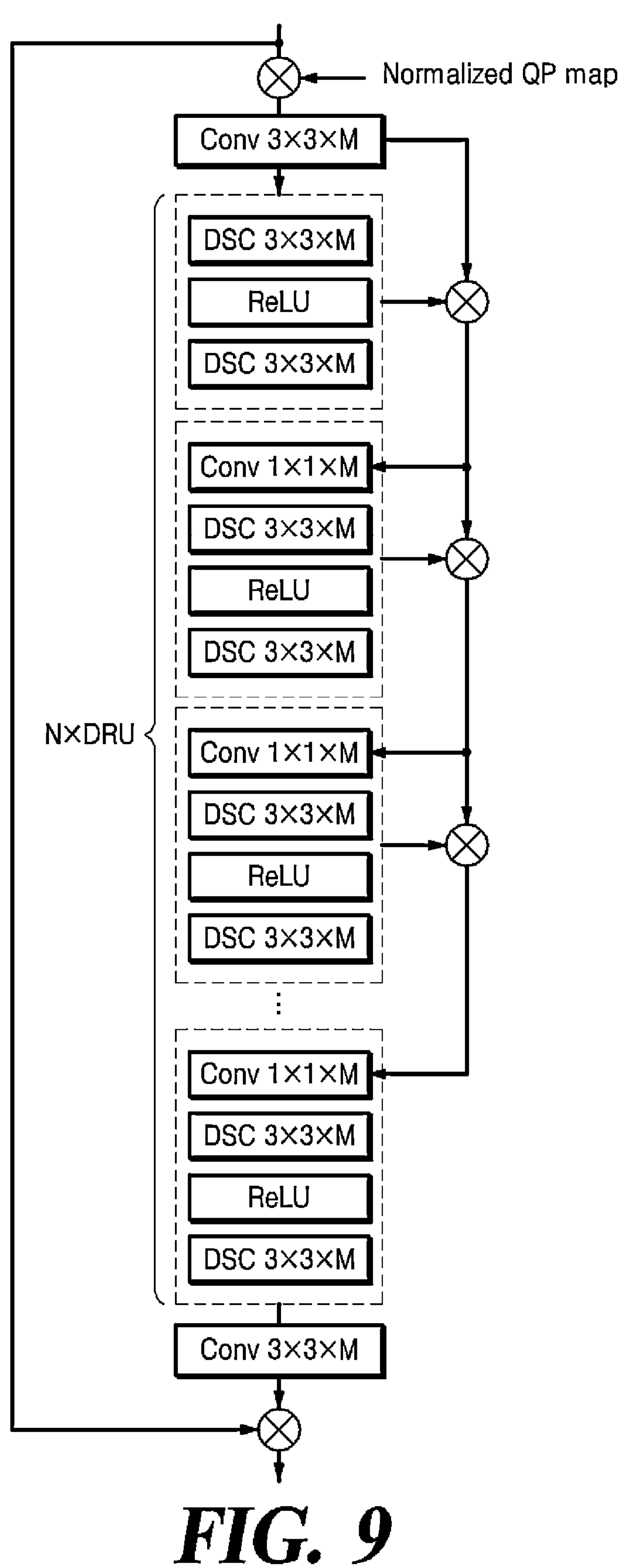
FIG. 9 is a diagram illustrating a convolutional neural network (CNN) based fixed-coefficient in-loop filter.

FIG. 9 is a diagram illustrating a CNN-based fixed-coefficient in-loop filter.

The input blocks (or input frames) are passed through a normalized QP map before being passed to subsequent stages. The normalized QP map is used to reduce inference error when quantized noise of different intensities is mixed in the learning and inference process. The kernel parameters that constitute the Dense Residual Unit (DRU) and convolution layers may be stored and used identically in the video encoding device and the video decoding device. In the example of FIG. 9, each DRU may include all or some of a convolution layer, a ReLU layer, or a depth-wise separable convolutional (DSC) layer.

Fixed-coefficient deep learning in-loop filters have the disadvantage of increasing the number of layers in the CNN and correspondingly increasing the computation time, as the fixed-coefficient deep learning in-loop filters need to provide general performance over a wide range of video frames.

II. Transformer

Transformer is a model proposed for performing sequence-to-sequence tasks in natural language processing, such as machine translation.

Traditional sequence-to-sequence models include an encoder-decoder structure that utilizes a recurrent neural network (RNN) or long short-term memory (LSTM) to output output words in sequence as input words are input. The encoder represents the input sequence as a vector representation and the decoder generates the output sequence based on the vector representation.

However, RNN-based models suffer from the limitation that the length of the input vector is limited. Additionally, because some of the input sequence information is lost during encoding, RNN models are limited in processing complex sentences. To compensate for this, a context vector is generated based on an attention mechanism that correlates the output of the decoder at a particular time with the output of the encoder, but the RNN model does not overcome the limitations described above.

The Transformer maintains the traditional encoder-decoder structure by using only attention and outperforms existing models in translation performance despite not using RNNs or LSTMs.

Before the overall structure of the transformer, the self-attention utilized in the Transformer is described.

Figure 10A:
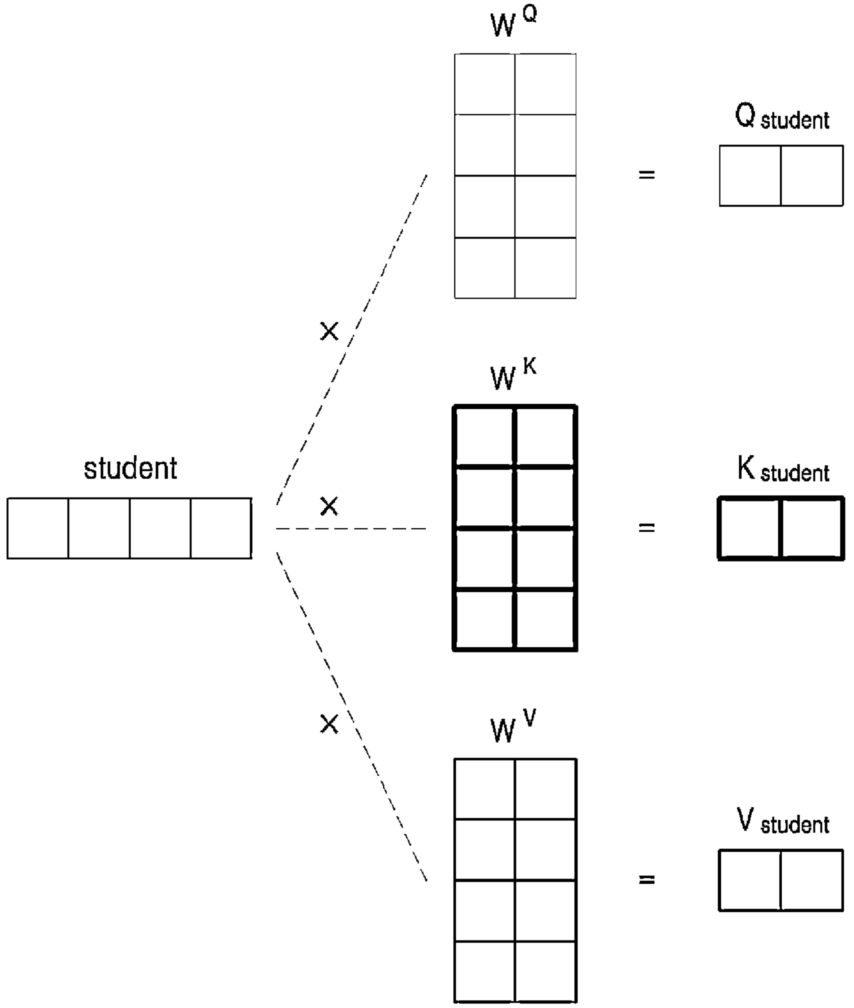
FIGS. 10A and 10B are diagrams illustrating the self-attention of vectors.
Figure 10B:
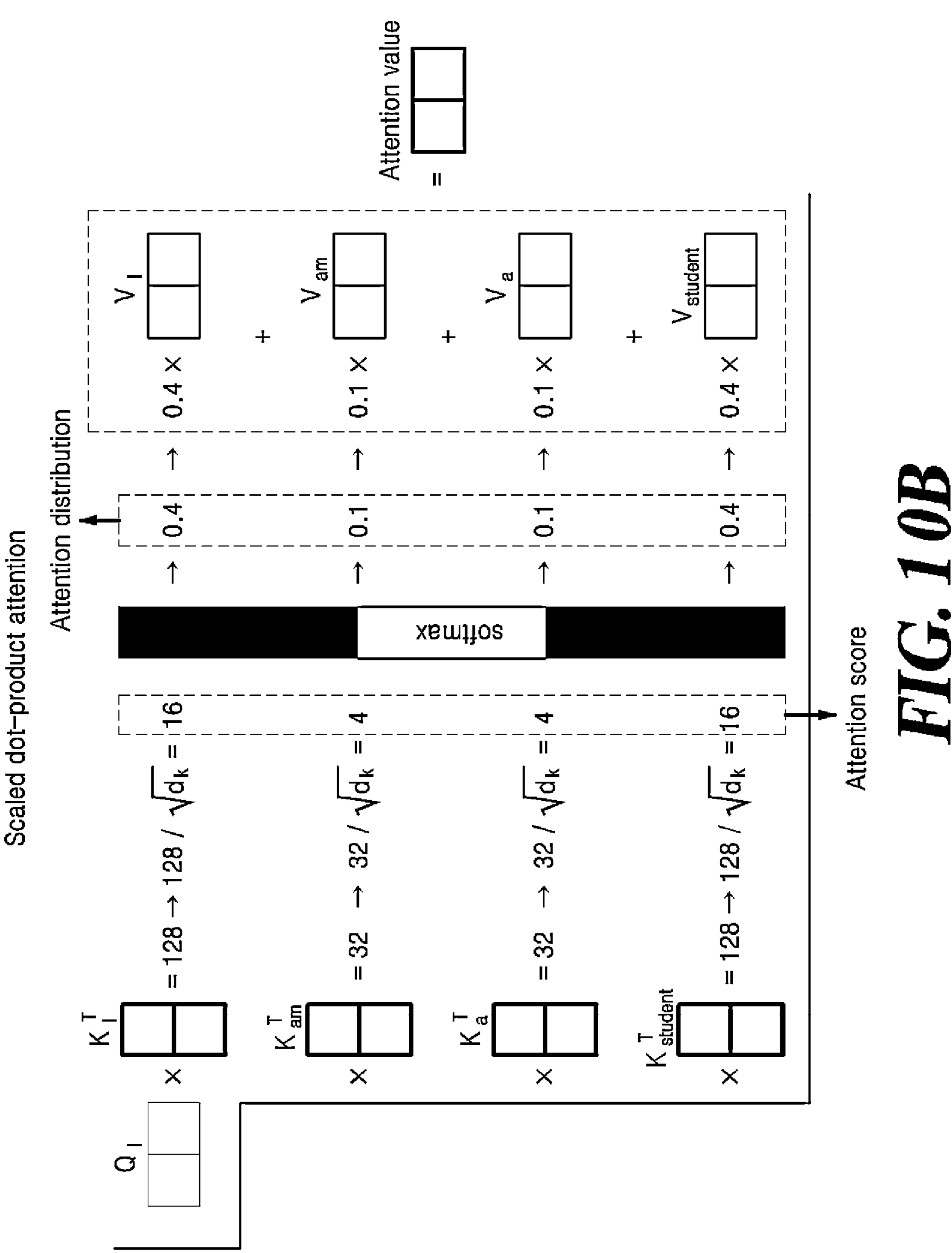

FIGS. 10A and 10B are diagrams illustrating the self-attention of vectors.

Self-attention is performed by an attention module (or "attention layer") within the Transformer. Hereinafter, it is assumed that the Transformer processes the sentence "I am a student" sequentially, with the attention module currently processing the input word "student."

First, the attention module multiplies the word vector corresponding to each word initially inputted to the Transformer by a weight matrix to generate a Q (Query) vector, a K (Key) vector, and a V (Value) vector, as illustrated in FIG. 10A. In the example of FIG. 10A, the weight matrices $W^Q$, $W^K$, and $W^V$ are the trained parameters. Additionally, for the input word "student," $Q_{student}$, $K_{student}$, and $V_{student}$ represent the Q vector, K vector, and V vector, respectively.

Then, for a given Q vector, the attention module computes attention scores with all K vectors. The attention module then applies the similarity, or attention score, as a weight to the V vectors mapped to each K vector. Finally, the attention module may weighted sum all of the V vectors reflecting the similarities to calculate an attention value for the input word.

The attention score may be calculated by scaled dot-product attention, which utilizes the inner product of two vectors, as shown in the example of FIG. 10B. The scaled dot-product attention may be expressed as Equation 1.

$$\text{score function } (q, k) = q \cdot k / \sqrt{d_k} \qquad \text{[Equation 1]}$$

Here, $d_k$ is a predefined constant.

The attention score function expresses the degree of association between the q and k vectors. In Equation 1, the score function utilizes an inner product, but the score function may also utilize any similarity between the two vectors such as cosine similarity, correlation, and the like.

Figure 11A:
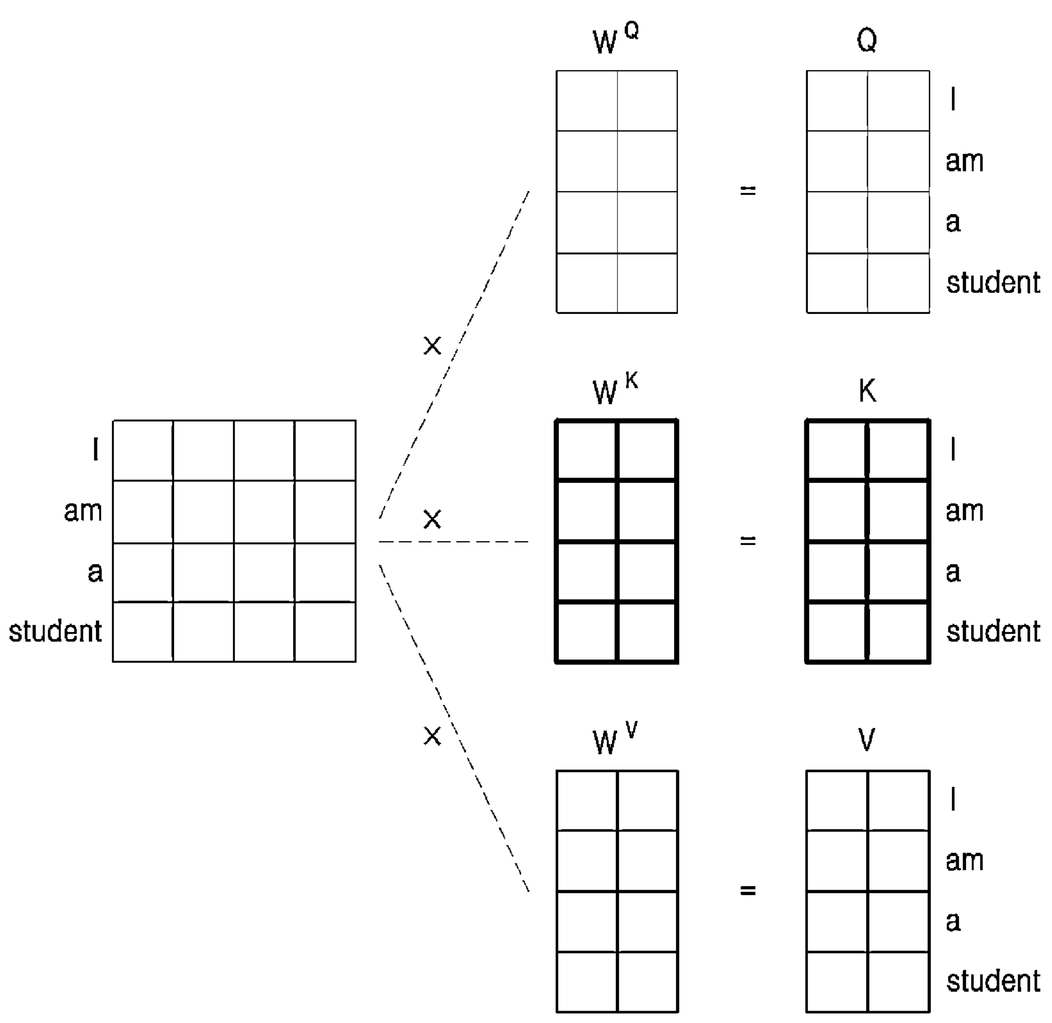
FIGS. 11A and 11B are diagrams illustrating the self-attention of a matrix.
Figure 11B:
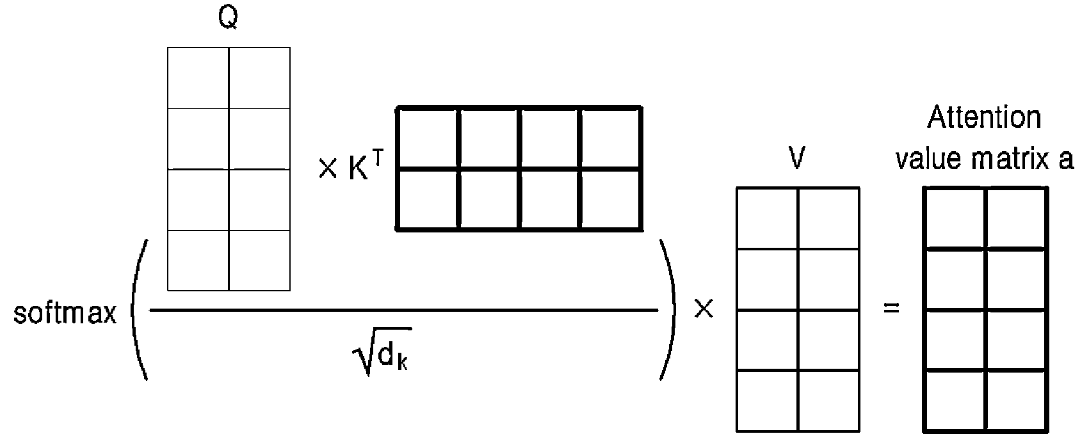

The above operation may be applied in parallel to all of "I," "am," and "a" in addition to "student," as shown in the examples of FIGS. 11A and 11B. In the examples of FIGS. 11A and 11B, for the input sentence "I am a student," Q, K, and V denote the Q matrix, K matrix, and V matrix, respectively. The final attention value matrix may be calculated as shown in Equation 2.

$$\text{Attention}(Q, K, V) = softmax\left(\frac{QK^T}{\sqrt{d_k}} + B\right)V \qquad \text{[Equation 2]}$$

Here, B is a matrix of positional encoding values, defined in advance. In the example of FIG. 11B, B is omitted.

Figure 12:
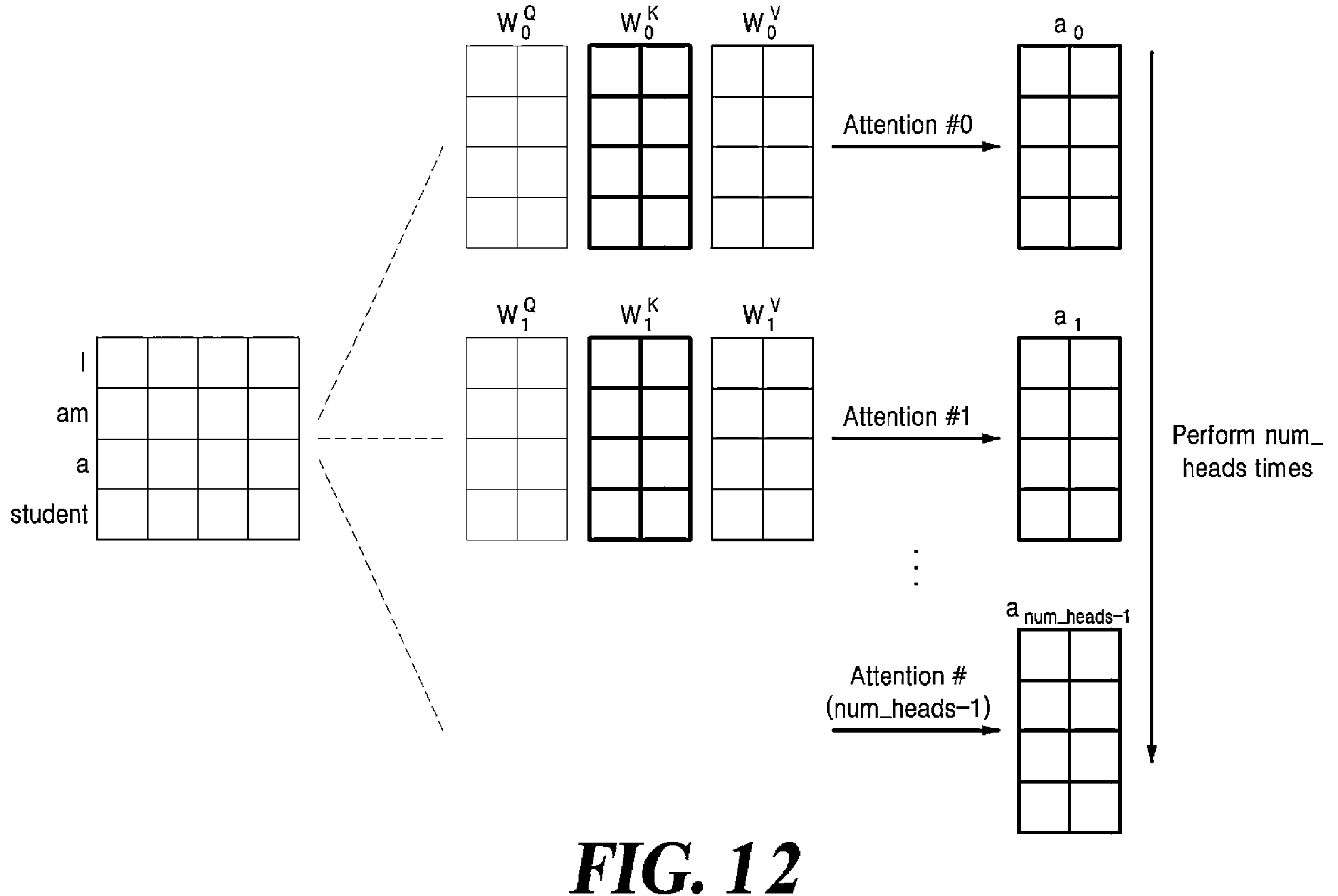
FIG. 12 is a diagram illustrating multi-head attention.

FIG. 12 is a diagram illustrating multi-head attention.

On the other hand, performing parallel attentions is more effective than a single attention for the generalization of learning. This is because different weights may be used to gather information from different perspectives on each word vector. In Transformer, parallel attentions are represented by a multi-head attention.

To apply the multi-head attention, the weight matrices $W^Q$, $W^K$, and $W^V$ may be trained for the number of attention heads (num_heads). As illustrated in FIG. 12, parallel attentions may be performed using weight matrices $$W^Q_{0 \ldots num\_head-1}, W^K_{0 \ldots num\_head-1}, \text{ and } W^V_{0 \ldots num\_head-1}.$$

The attention outputs from each head may then be concatenated, multiplied by a weight matrix, and a final attention may be generated.

Figure 13:
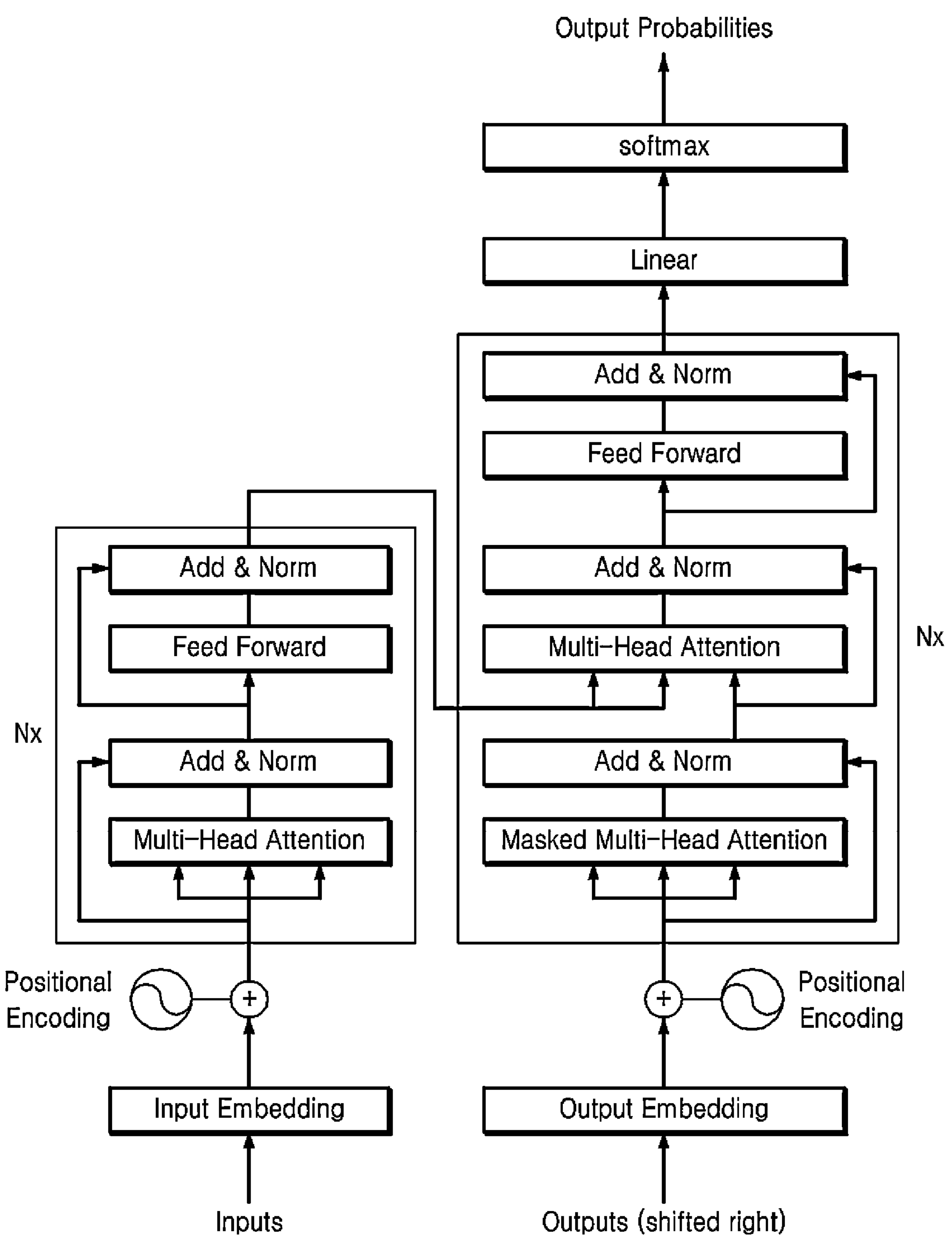
FIG. 13 is a diagram illustrating the structure of Transformer.

FIG. 13 is a diagram illustrating the structure of Transformer.

The Transformer includes N encoders and N decoders.

The encoder includes N layers. One layer includes two sublayers, i.e., a self-attention and a feed-forward neural network. Here, self-attention refers to the case where Q, K, and V are equal. Furthermore, the self-attention layer of the encoder performs the multi-head attention as described above.

Meanwhile, the input sentence to the encoder is subjected to positional encoding. The Transformer may not receive words sequentially. Therefore, to represent the positional information of the words, positional information is added in token order by using a sinusoidal function. In the example of FIG. 13, "input embedding" refers to an input sentence represented in the form of an embedding.

The decoder includes N layers, the same as the encoder. A layer includes three sublayers. As with the encoder, the sentence matrix after positional encoding is inputted to the decoder. In the example of FIG. 13, "output embedding" refers to the input sentence to the decoder, represented in the form of an embedding.

As with sequence-to-sequence, the first sublayer of the decoder is trained based on teacher forcing with GT as the next input to the decoder, so the decoder is trained to predict the words at each point in time when given a matrix of target sentences. The matrix based on the input sentence is masked to avoid referring to words at future points in time so that the self and previous words are referenced. Fundamentally, the first sublayer of the decoder is structurally identical to the first sublayer of the encoder because the first sublayer of the decoder is self-attentive and performs multi-head attention. The behavior of the first sublayer of the decoder is referred to as look-ahead attention.

The second sublayer of the decoder computes an attention score matrix by using the output of the first self-attention layer as a Q matrix and using the K matrix and V matrix from the last layer of the encoder. The second sublayer of the decoder is called encoder-decoder attention. Meanwhile, the third sublayer is a feed-forward neural network.

In the field of vision processing, CNN structures are often used. Based on the outcome of Transformer utilized in natural language processing, a standard Transformer may be modified to a minimal extent, and then the modified Transformer may be directly applied to the image processing. To this end, the image may be partitioned into patches, which may be processed in the same way as tokens in NLP. A linear embedding sequence of these patches may be fed into the Transformer. Transformers utilized in vision applications are referred to as vision Transformers.

Figure 14:
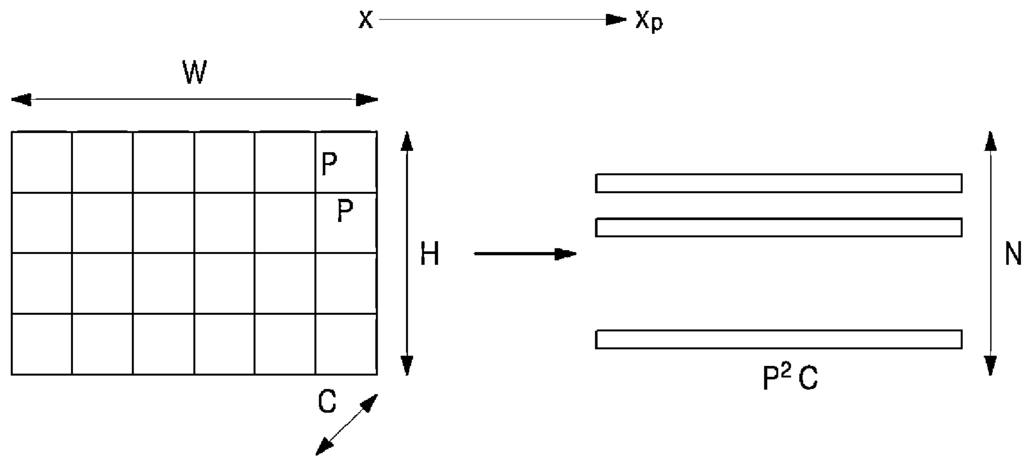
FIG. 14 is a diagram illustrating the input preprocessing of a vision Transformer.

FIG. 14 is a diagram illustrating the input preprocessing of a vision Transformer.

The standard Transformer receives as input a one-dimensional sequence of token embeddings. To input the one-dimensional sequence to the vision Transformer, the two-dimensional image needs to be preprocessed. To do so, the two-dimensional input image $X \in R^{W \times H \times C}$ is changed into a sequence of flattened patches, $x_p \in R^{N \times P \times P \times C}$, as illustrated in FIG. 14. The size of each patch into which the two-dimensional input image is divided is P×P. N is the number of patches, and C represents the dimensionality of the color information.

Alternatively, instead of using image patches, a feature map of a CNN may be used as an input sequence.

The following embodiments are described centered around the video encoding device but may be equally applicable to the video decoding device.

III. Transformer-Based In-Loop Filter

Figure 15:
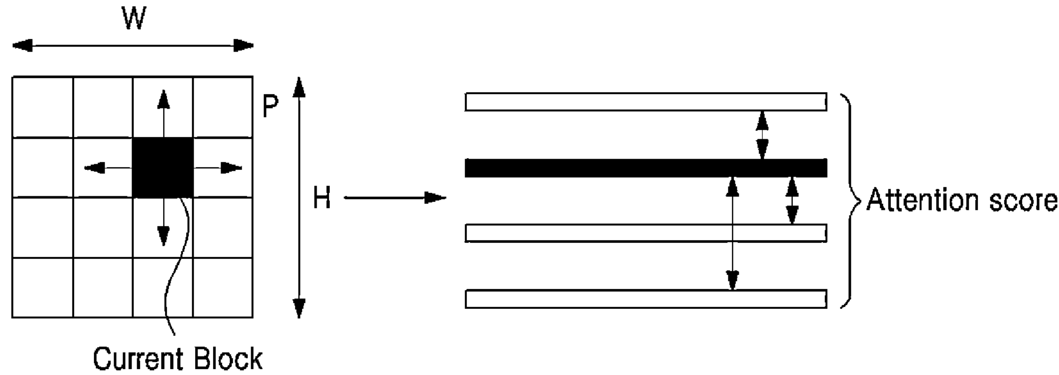
FIG. 15 is a diagram illustrating the application of an attention process to the current video block, according to at least one embodiment of the present disclosure.

FIG. 15 is a diagram illustrating the application of an attention process to the current video block, according to at least one embodiment of the present disclosure.

In the example of FIG. 15, a video frame of size W×H is divided into video blocks. The current video block (hereinafter, the "current block") outputs an attention score with itself and other blocks in the frame by using the attention functions shown in Equation 1 and Equation 2 above. In Equation 1 and Equation 2, the attention functions utilizes an inner product, but may also utilize similarities between two blocks, such as cosine similarity, correlation, mean squared error (MSE), sum of absolute difference (SAD), and the like.

The input blocks to the attention function are located in a grid of N×M and not overlap each other. Alternatively, the input blocks may overlap off the grid. As illustrated in FIG. 15, by setting the current block as a query and calculating an attention score between the current block and the neighboring blocks, an attention value vector of the current block may be outputted. To utilize Equation 1 and Equation 2, the two-dimensional current block may need to be changed into a one-dimensional vector. Of the attention scores illustrated in FIG. 15, the second vector from the top represents the current block's self-attention score with itself, and the rest represent attention scores with neighboring blocks.

In this case, a video block applied to an attention module that computes an attention function may be defined as follows.

A video block may be used as a basic unit of encoding, such as a CTU, CU, Prediction Unit (PU), and the like. The width and height of the video blocks are equal. Alternatively, the video blocks may have different widths and heights.

The video block may be used after being divided into subblocks. The subblocks may be used with a fixed width and height, such as a size of 4×4. Alternatively, the size may be set to A/S, using a scale factor S. Here, A represents the width or height of the video block before partitioning.

Figure 16:
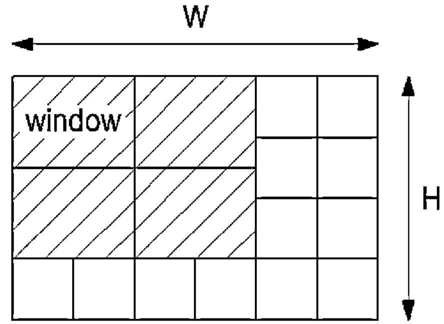
FIG. 16 is a diagram illustrating a consolidated region, according to at least one embodiment of the present disclosure.

As shown in the example of FIG. 16, a region may be generated by combining multiple video blocks. In this case, the region (window in the example of FIG. 16) may be divided into blocks of arbitrary size.

The two video blocks utilized in the attention operation shown in Equation 1 have the same size. If the two video blocks utilized in the attention calculation are of different sizes, padding is utilized to equalize the two video blocks in size.

The existing video block may be downsampled and used as an input to the attention function. Alternatively, the original video block may be upsampled and used as an input to the attention function. Alternatively, the existing video block may be downsampled, upsampled, and then used as an input to the attention function.

On the other hand, the present disclosure does not compute an attention score between two video blocks in the following cases.

If the two video blocks are located in different windows from the regions (i.e., windows) defined in FIG. 16, an attention score is not computed.

If the two video blocks are in different CTUs, an attention score is not computed.

Figure 17:
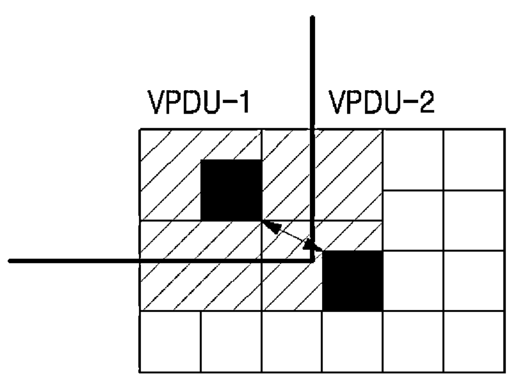
FIG. 17 is a diagram illustrating a case of no calculation of attention score, according to at least one embodiment of the present disclosure.

As shown in the example of FIG. 17, if the two video blocks reside in different Virtual Pipeline Data Units (VPDUs), an attention score is not computed. Here, a VPDU is a unit of data that can be processed by a virtual pipeline. The VPDU is the largest unit that can be encoded and decoded at one time and may be utilized to reduce the cost of hardware implementation as the size of the CTU increases. Furthermore, the VPDU refers to a unit of data processing for encoding and decoding, which is not necessarily limited to the term VPDU.

For a block that is decoded after the current block, an attention score between the relevant block and the current block may not be computed.

The video encoding device may apply image reconstruction and denoising techniques utilizing a vision Transformer to the in-loop filtering to improve the quality of the reconstructed frame.

Figure 18:
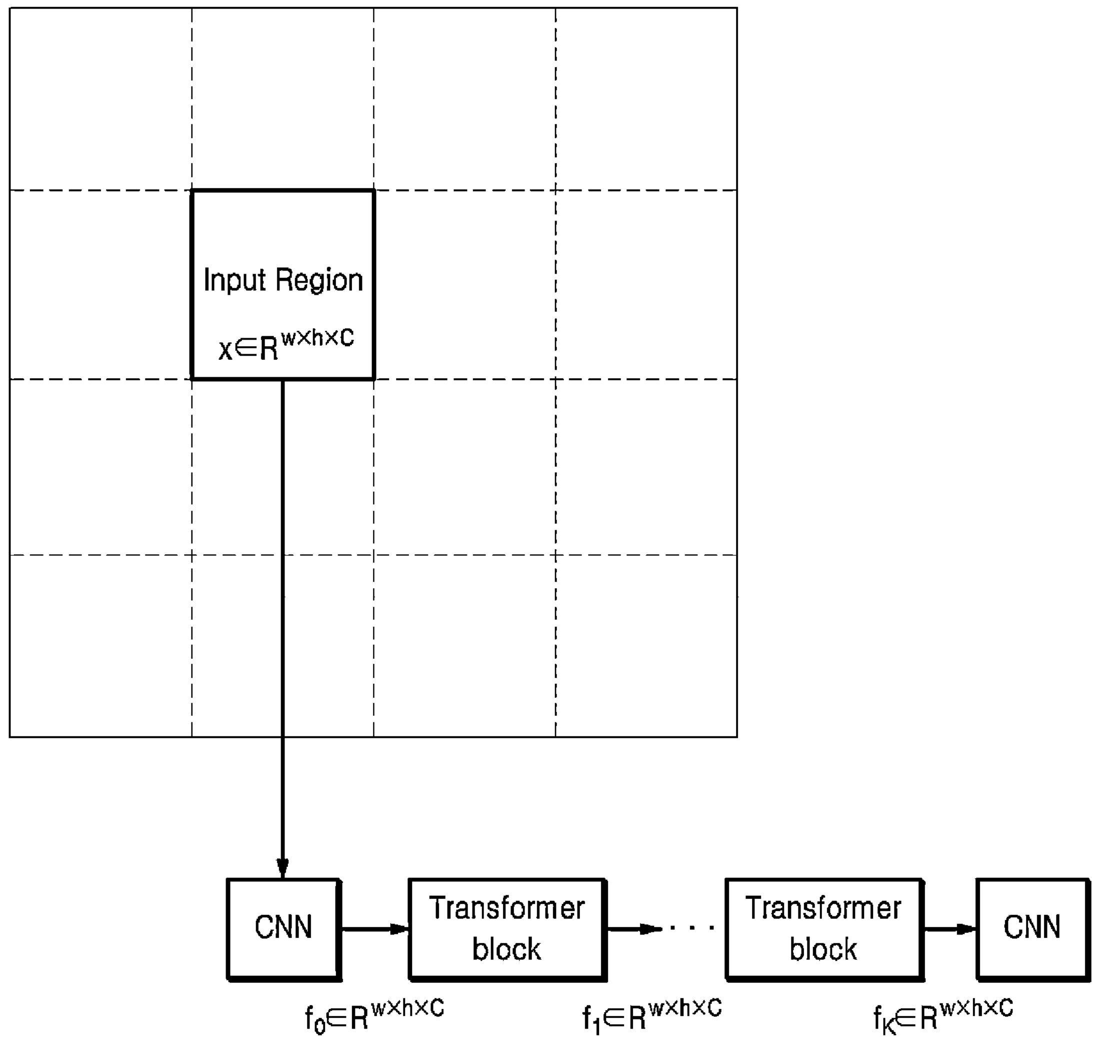
FIG. 18 is a diagram illustrating a Transformer-based in-loop filter according to at least one embodiment of the present disclosure.

FIG. 18 is a diagram illustrating a Transformer-based in-loop filter according to at least one embodiment of the present disclosure.

The Transformer-based in-loop filter (hereinafter, "in-loop filter") utilizes one of the inputs or outputs of the deblocking filter 182, the SAO filter 184, or the ALF 186 as an input image. The video encoding device selects an input region $x \in R^{w \times h \times C}$ from the input image. Here, w and h represent the width and height of the input region. C represents the dimensionality of the color information.

The in-loop filter may utilize a subject block directly as an input to the Transformer. Alternatively, as shown in the example of FIG. 18, the in-loop filter may use a CNN to extract a video feature $f_0 \in R^{w \times h \times C}$ and use the extracted feature as an input. Then, the in-loop filter uses K consecutive Transformer blocks to generate feature $f_1$ through feature $f_K$. The dimension of feature $f_1$ through feature $f_K$ is the same as the dimension of $f_K$.

The video encoding device inputs the feature $f_K$ into a neural network that performs arbitrary image reconstruction to generate an enhanced video region corresponding to the input region $x \in R^{w \times h \times C}$. At this time, as a structure of the neural network used for image reconstruction, EDSR, VDSR, and the like as described above may be utilized.

Figure 19A:
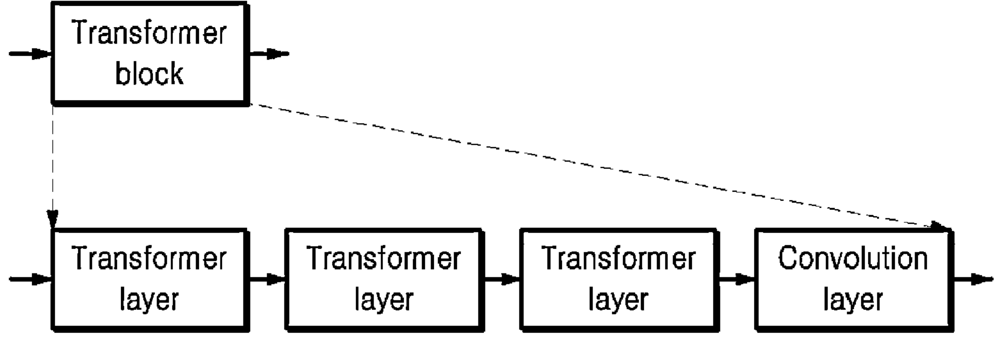
FIGS. 19A and 19B are diagrams illustrating Transformer blocks according to embodiments of the present disclosure.
Figure 19B:
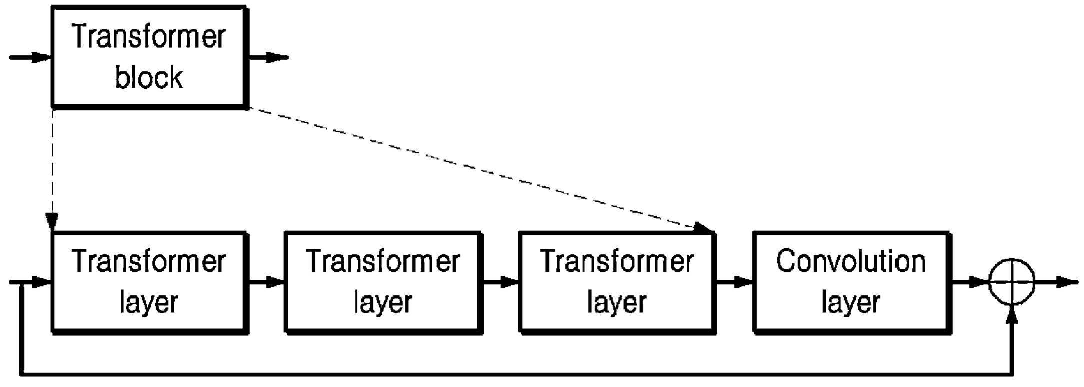

FIGS. 19A and 19B are diagrams illustrating Transformer blocks according to embodiments of the present disclosure.

As shown in the example of FIG. 19A, the Transformer block may include consecutive Transformer layers. In this case, the last convolution layer may be optionally placed.

As shown in the example of FIG. 19B, the Transformer block may be organized as a residual block of consecutive Transformer layers by using a skip connection. In this case, the last convolution layer may be selectively placed. In this way, the residual block form of the convolution layer as illustrated in FIGS. 8 and 9 is applied to the Transformer layers.

On the other hand, one Transformer layer that is illustrated in FIG. 19A may be implemented according to the Transformer structure as illustrated in FIG. 13. Here, N=1 is set, so that the Transformer layer has one encoder layer and one decoder layer.

The input to the transformer block is $fi \in R^{w \times h \times C}(i=0, 1, \ldots, K-1)$, as illustrated in FIG. 18. If no CNN exists before the first transformer block, an input region $x \in R^{w \times h \times C}$ may be utilized instead of $f_0$ as an input to the first Transformer block. The Transformer block partitions its input into overlapping and non-overlapping patches and converts each partitioned patch into a feature. The input to each Transformer block may correspond to the window illustrated in FIG. 16, and the patches may be video blocks into which the window is partitioned. Each patch may have a size of P×P, as in the example of FIG. 15. Alternatively, the patches may have different arbitrary sizes.

The Transformer block may compute the features of each patch by using the self-attention operation according to FIG. 10A, FIG. 10B, and Equation 1.

At this point, if each patch falls outside of a CTU boundary or outside of a VPDU boundary, the self-attention of that patch is not computed. If a partial region of a partitioned patch is out of the boundary, self-attention may not be computed for the partial region of the patch, by using a mask for marking such out-of-bounds partial region.

Alternatively, if each patch is later in the decoding order than the current block, self-attention is not computed for that patch. If some region of a split patch exists in a later order, self-attention may not be computed for that region of the patch, by using a mask for marking such patch region that exists in a later order.

On the other hand, the Transformer-based in-loop filter may be a fixed-coefficient in-loop filter. Accordingly, the parameters constituting the CNN and each of the Transformer blocks included in the in-loop filter may be used after being pre-trained and stored identically in the video encoding device and the video decoding device.

The following describes methods for the video encoding device or video decoding device to enhance the image quality of a reconstructed frame by using the Transformer-based in-loop filter. A computing device hereinafter refers to the video encoding device or the video decoding device.

Figure 20:
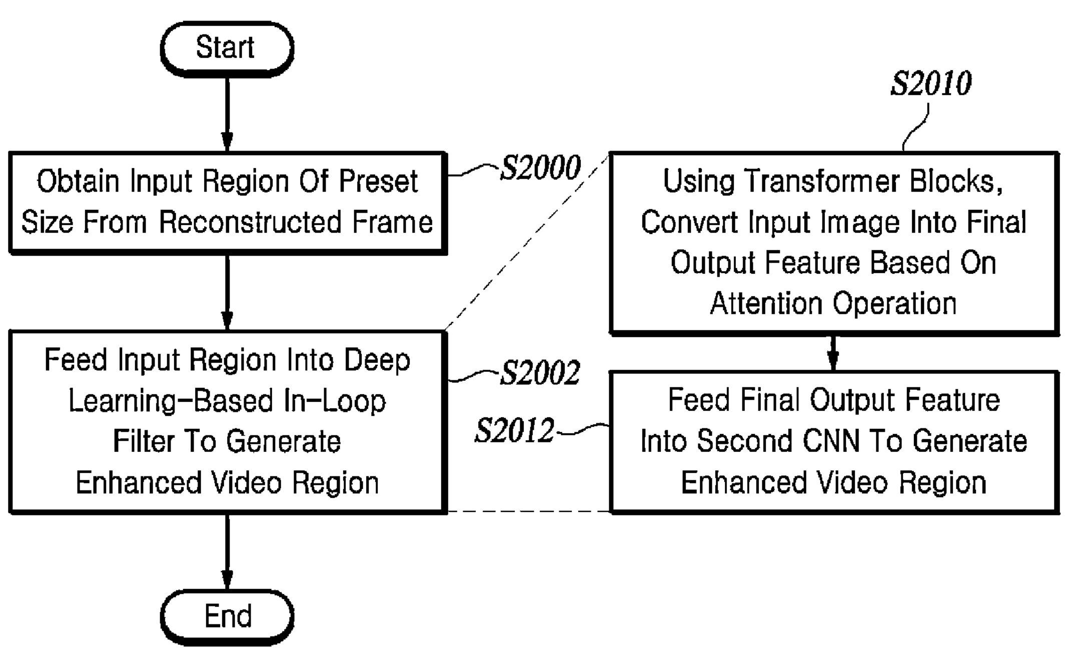
FIG. 20 is a flowchart of a method of enhancing picture quality, according to at least one embodiment of the present disclosure.

FIG. 20 is a flowchart of a method of enhancing picture quality, according to at least one embodiment of the present disclosure.

The computing device obtains an input region of a preset size from a reconstructed frame (S2000). Here, the reconstructed frame is a reconstructed frame of an original frame, which is reconstructed in advance by the computing device.

The computing device feeds the input region into a deep learning-based in-loop filter to generate an enhanced video region that approximates the original frame (S2002) Here, the in-loop filter includes K consecutive Transformer blocks (where K is a natural number) and a second CNN.

The computing device may perform the step of generating the enhanced video region (Step S2002) as follows.

Using the Transformer blocks, the computing device converts the input image into a final output feature based on an attention operation (S2010).

The computing device partitions the input feature of each of the transformer blocks into patches and applies the attention operation to each patch to generate an output feature for the input feature of each of the Transformer blocks. The computing device sets each patch as a query and calculates a self-attention score for each patch and an attention score between each patch and other patches, based on the similarity between the two patches utilized in the attention operation. The computing device may then weighted sum the attention scores to generate an attention value of each patch.

The computing device inputs the final output features into the second CNN to generate the enhanced video region (S2012).

Figure 21:
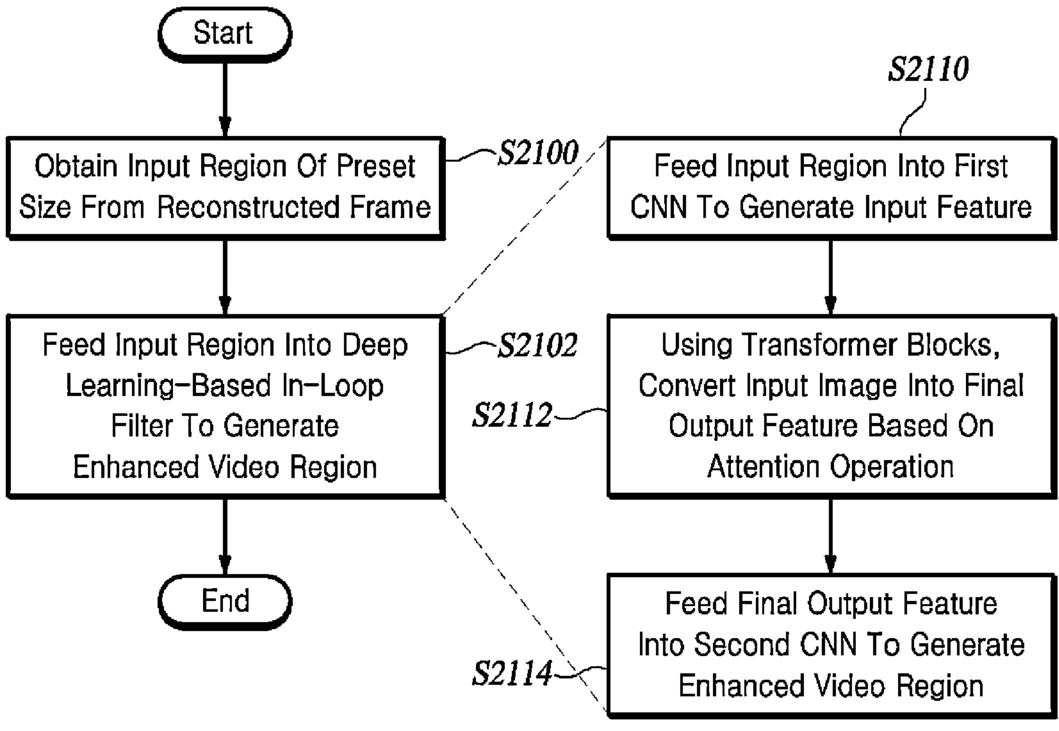
FIG. 21 is a flowchart of a method of enhancing picture quality, according to another embodiment of the present disclosure.

FIG. 21 is a flowchart of a method of enhancing picture quality, according to another embodiment of the present disclosure.

The computing device obtains an input region of a preset size from a reconstructed frame (S2100). Here, the reconstructed frame is a reconstruction of the original frame, which is reconstructed in advance by the computing device.

The computing device feeds the input region into the deep learning-based in-loop filter to generate an enhanced video region that approximates the original frame (S2102).

Here, the in-loop filter includes a first CNN, K consecutive Transformer blocks (where K is a natural number), and a second CNN.

The computing device may perform the step of generating the enhanced video region, Step S2102, as follows.

The computing device inputs the input region into the first CNN to generate input features (S2110).

The computing device, using Transformer blocks, converts the input features into final output features based on an attention operation (S2112).

The computing device inputs the final output features into the second CNN to generate the enhanced video region (S2114).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

180: loop filter unit
155: entropy encoder
510: entropy decoder
560: loop filter unit

What is claimed is:

1. A method performed by a video decoding device for enhancing a picture quality of a reconstructed frame, the method comprising:

obtaining an input region of a preset size from the reconstructed frame which is a reconstruction of an original frame and has been reconstructed in advance by the video decoding device; and generating an enhanced video region that approximates the original frame by feeding the input region into an in-loop filter that is deep learning-based, wherein the in-loop filter comprises K consecutive Transformer blocks, and K is a natural number, wherein generating the enhanced video region includes converting, by using the K consecutive Transformer blocks, an input image into a final output feature based on an attention operation, and wherein at least one of the K consecutive Transformer blocks performs the attention operation based on a query vector, a key vector, and a value vector.

2. The method of claim 1, wherein:

the in-loop filter further comprises a first convolutional neural network (CNN); and generating the enhanced video region further includes generating an input feature by feeding the input region into the first CNN, and converting, by using the K consecutive Transformer blocks, the input feature into the final output feature based on the attention operation.

3. The method of claim 2, wherein the in-loop filter further comprises a second CNN, and wherein generating the enhanced video region includes feeding the final output feature into the second CNN to generate the enhanced video region.

4. The method of claim 2, wherein converting the input feature includes:

partitioning an input feature of each of transformer blocks into patches, and applying an attenuation operation to each of the patches to generate an output feature for the input feature of each of the transformer block.

5. The method of claim 4, wherein converting the input feature includes:

setting each of the patches as a query;

calculating, based on a similarity between two patches used in the attention operation, a self-attention score for each of the patches, and attention scores between each of the patches and other patches; and weighted summing the attention scores to generate an attention value for each of the patches.

6. The method of claim 4, wherein converting the input feature includes:

when two patches used in the attention operation are not equal in size, applying a padding to equalize the two patches in size.

7. The method of claim 5, wherein converting the input feature includes:

not calculating the attention scores when the two patches used in the attention operation are not present together in the input feature.

8. The method of claim 5, wherein converting the input feature includes:

not calculating the attention scores when the two patches used in the attention operation reside in different data processing units, which are coding tree units (CTUs) or virtual pipeline data units (VPDUs).

9. The method of claim 4, wherein the input feature includes:

not applying the attenuation operation to each of the patches when each of the patches falls outside a boundary of a preset data processing unit; and not applying the attenuation operation to a partial region of each of the patches based on a mask that indicates the partial region outside the boundary when the partial region falls outside the boundary.

10. The method of claim 4, wherein converting the input feature includes:

not applying the attention operation to each of the patches when each of the patches is present in a later order of decoding than a current block; and not applying the attenuation operation to a partial region of each of the patches based on a mask that indicates the partial region in the later order when the partial region is present in the later order.

11. The method of claim 4, wherein each of the Transformer blocks includes:

consecutive Transformer layers; and one optional convolution layer, wherein each of the consecutive Transformer layers includes one encoder layer and one decoder layer.

12. The method of claim 11, wherein each of the Transformer blocks is formed as a residual block of the consecutive Transformer layers by using a skip connection.

13. A method performed by a video encoding device for enhancing a picture quality of a reconstructed frame, the method comprising:

obtaining an input region of a preset size from the reconstructed frame, which is a reconstruction of an original frame and has been reconstructed in advance by the video encoding device; and generating an enhanced video region that approximates the original frame by feeding the input region into an in-loop filter that is deep learning-based, wherein the in-loop filter comprises K consecutive Transformer blocks, and K is a natural number, wherein generating the enhanced video region includes converting, by using the K consecutive Transformer blocks, an input image into a final output feature based on an attention operation, and wherein at least one of the K consecutive Transformer blocks performs the attention operation based on a query vector, a key vector, and a value vector.

14. The method of claim 13, wherein:

the in-loop filter further comprises a first convolutional neural network (CNN); and generating the enhanced video region further includes generating an input feature by feeding the input region into the first CNN, and converting, by using the K consecutive Transformer blocks, the input feature into the final output feature based on the attention operation.

15. The method of claim 14, wherein:

the in-loop filter further comprises a second CNN; and generating the enhanced video region includes feeding the final output feature into the second CNN to generate the enhanced video region.

16. A non-transitory computer-readable recording medium storing a bitstream generated by a video encoding method, the video encoding method comprising:

obtaining an input region of a preset size from a reconstructed frame, which is a reconstruction of an original frame and has been reconstructed in advance by a video encoding device; and generating an enhanced video region that approximates the original frame by feeding the input region into an in-loop filter that is deep learning-based, wherein the in-loop filter comprises K consecutive Transformer blocks, and K is a natural number, wherein generating the enhanced video region includes converting, by using the K consecutive Transformer blocks, an input image into a final output feature based on an attention operation, and wherein at least one of the K consecutive Transformer blocks performs the attention operation based on a query vector, a key vector, and a value vector.

* * * * *